Figure 1:
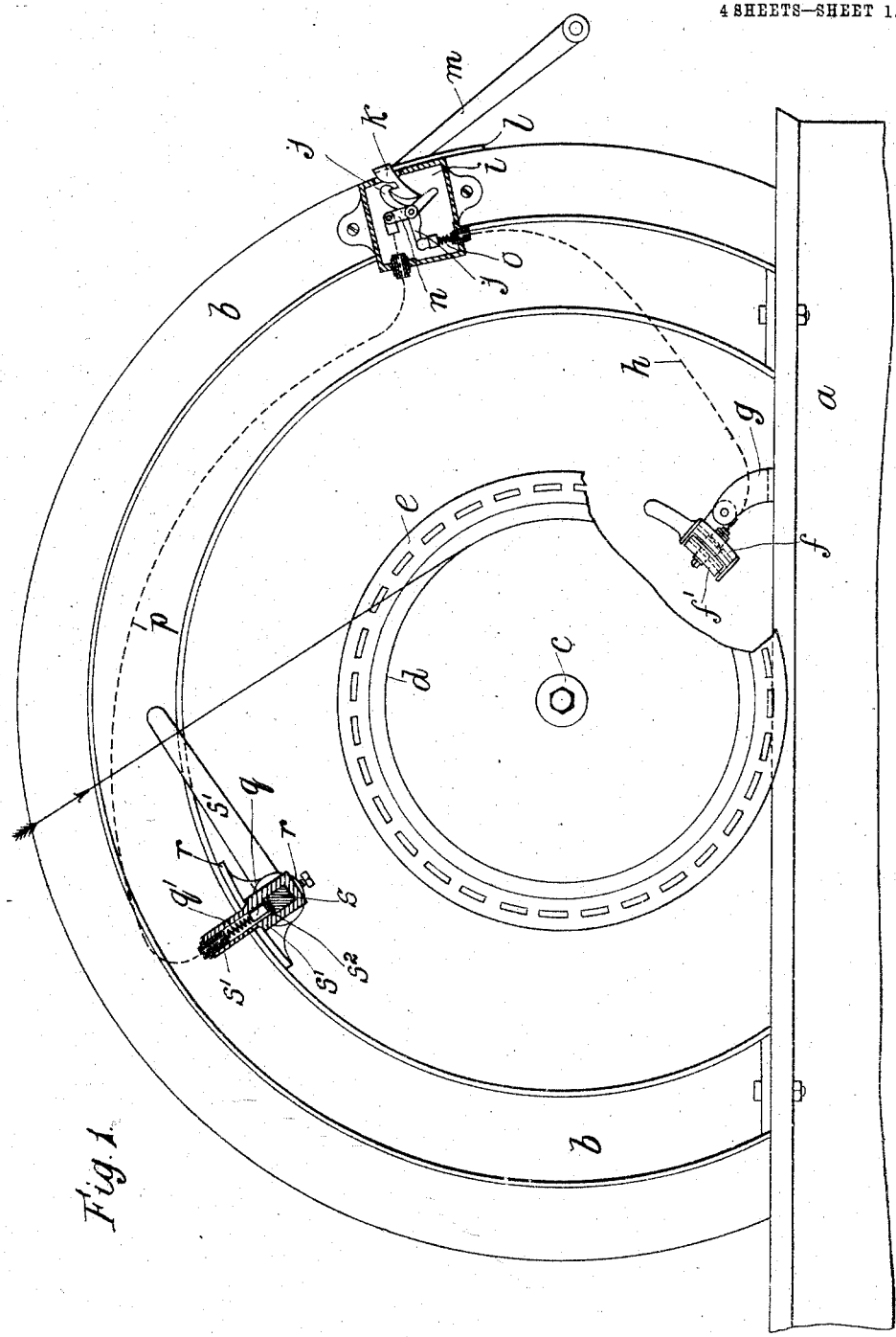

W. L. HOLLAND.
CARDING ENGINE AND LIKE MACHINE.
APPLICATION FILED OCT. 24, 1907.

927,242.

Patented July 6, 1909.
4 SHEETS—SHEET 1.

WITNESSES

INVENTOR
William Lewis Holland

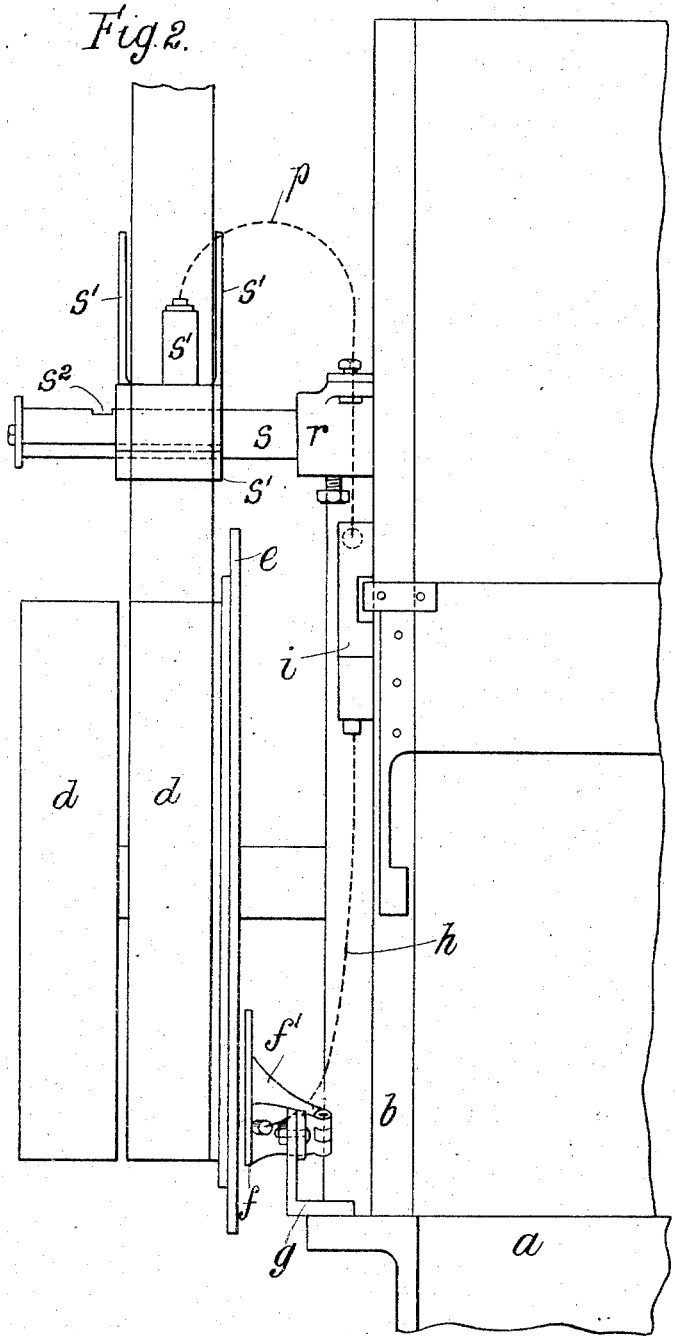

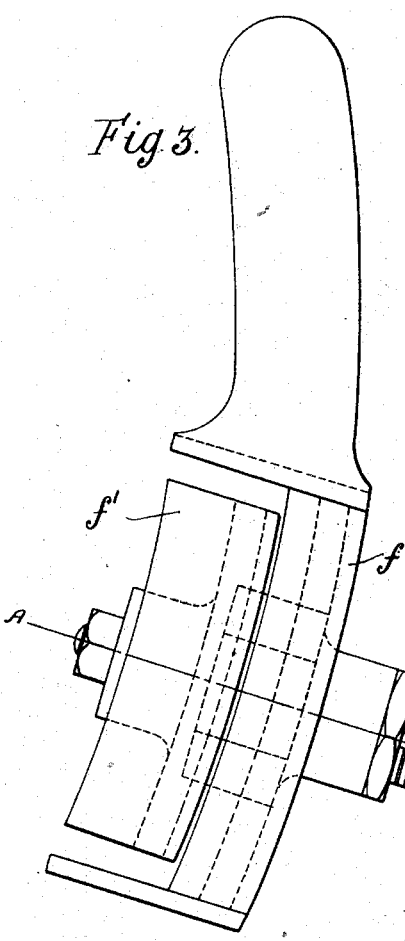
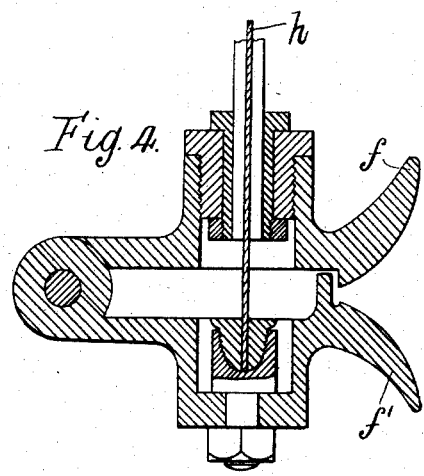
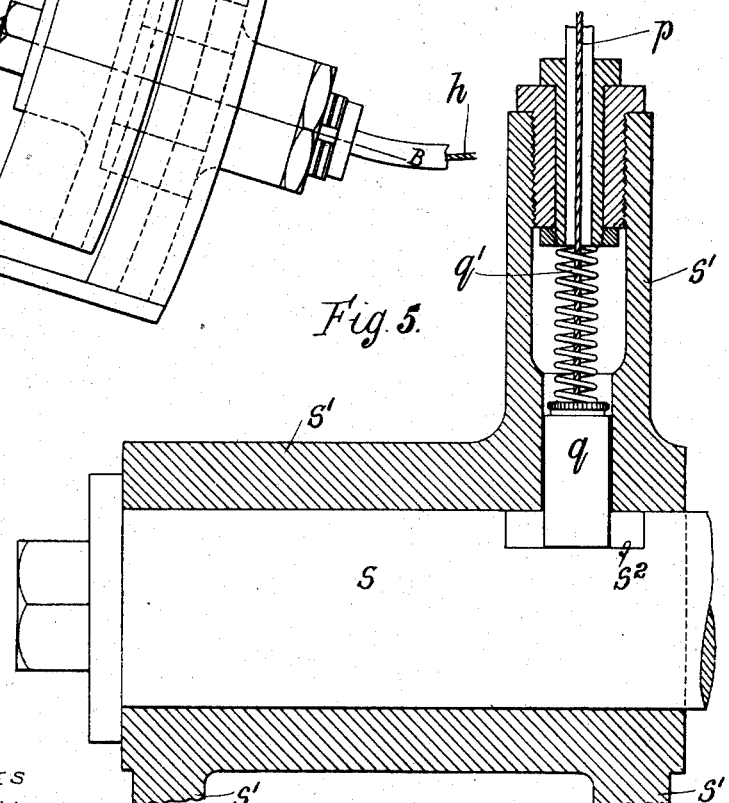

W. L. HOLLAND.
CARDING ENGINE AND LIKE MACHINE.
APPLICATION FILED OCT. 24, 1907.
927,242.
Patented July 6, 1909.
4 SHEETS—SHEET 4.
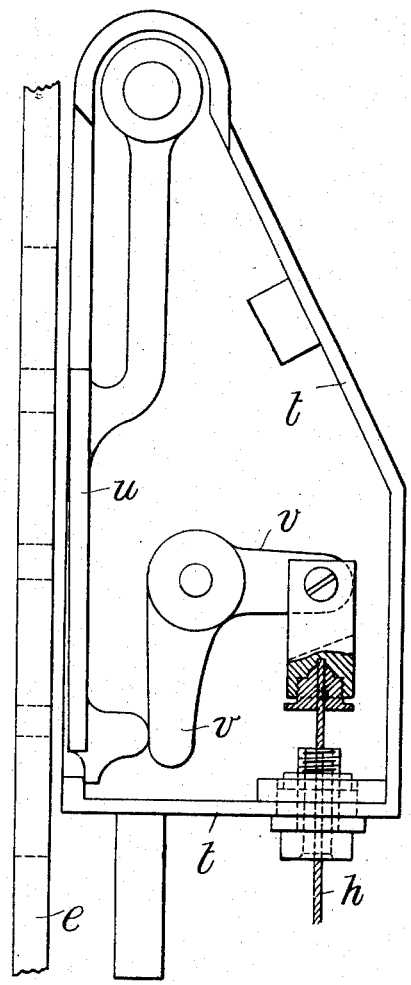
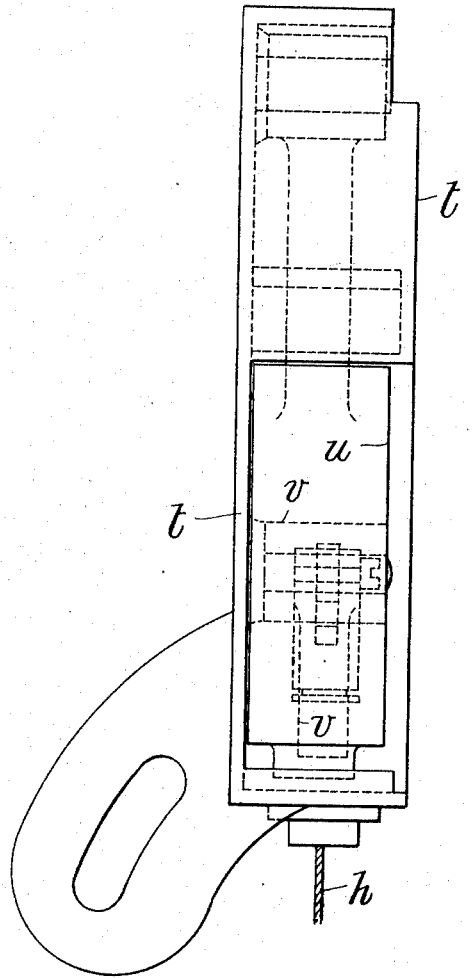

UNITED STATES PATENT OFFICE.

WILLIAM LEWIS HOLLAND, OF PRESTON, ENGLAND.

CARDING-ENGINE AND LIKE MACHINE.

No. 927,242.  Specification of Letters Patent.  Patented July 6, 1909.

Application filed October 24, 1907. Serial No. 398,955.

*To all whom it may concern:*

Be it known that I, WILLIAM LEWIS HOLLAND, a subject of the King of Great Britain, residing at Adelphi Street Brass and Iron Works, Preston, in the county of Lancaster, England, have invented new and useful Improvements Relating to Carding-Engines and Like Machines, of which the following is a specification.

My invention relates to carding engines and like machines and has for its object to prevent the cover of the main cylinder or like part from being opened until the cylinder has come to a dead stop, and further, to prevent the main cylinder from being restarted until the cover has been closed. I accomplish this object by forming with or attaching to the driving pulley of the main cylinder, a ring which is slotted circumferentially at frequent intervals. Inside the ring I mount on the pedestal or engine frame a pair of plates hinged or pivoted and held together by a Bowden brake wire or other suitable connection which is attached at one end to one plate and passes freely through a hole in the other plate and at the other end is connected to a spring locking bolt in a casing. The spring of this bolt through the connecting wire holds the two plates normally together and while in this position the bolt engages a pawl or catch attached to the cylinder cover which is thus latched. The pawl or catch while latched by the locking bolt holds back one end of a lever which is connected at the other end by a second Bowden brake wire or equivalent to a second spring locking bolt carried on the boss of the strap fork, and this second bolt is held within its casing while the aforesaid pawl or catch remains latched.

When the driving pulley is stopped a wedge or lever can be inserted through one of the slots in the ring to force the pivoted plates apart, and thereby withdraw the first spring locking bolt and unlatch the pawl or catch and allow the cover to be opened. Simultaneously the removal of the latch releases the second spring locking bolt which enters a hole in the bar or guide on which the strap fork slides and so prevents the driving belt being shifted on to the fast pulley until the cover is again closed.

In the accompanying four sheets of drawings—Figure 1 is a side elevation, partly in section, of part of a carding engine to which my improvements are applied, Fig. 2 is an end view of part of Fig. 1. Figs. 3, 4 and 5 are details of parts of the same on a larger scale. Figs. 6 and 7 are modifications of Figs. 3 and 4.

In the drawings,—$a$ designates part of the frame of the machine, $b$ the bend secured to the frame; $c$ the axle of the main cylinder; $d$ one of the driving pulleys; $e$ a ring which is slotted circumferentially at frequent intervals and is cast or formed with the driving pulley; $f, f'$, a pair of hinged or pivoted plates; $g$ a bracket secured to the frame for carrying the plates $f, f'$; $h$ a Bowden brake wire or other suitable connection; $i$ a casing secured to the bend $b$; $j$ a pivoted hooked lever or locking bolt in the casing to which one end of the wire $h$ is secured; $k$ a catch; $l$ the cover of the main cylinder of the carding engine to which the catch $k$ is secured; $m$ one of the arms or hinges of the cover; $n$ a second lever pivoted in the casing $i$; $o$ a spring which holds the lever $j$ and the catch $k$ in their locked positions, see Fig. 1 and also through the wire $h$, holds the plates $f, f'$, together; $p$ a second Bowden wire secured at one end of the lever $n$; $q$ a locking bolt; $q'$ a spiral spring above the bolt, $r$ the strap fork bracket, $s$ a bar fitted in a hole in the bracket $r$; $s'$ the strap fork and fixing which slides upon the bar $s$; $s^2$ a notch cut in the bar $s$ opposite the end of the spring bolt $q$.

Figs. 1 and 2 represent all the parts in the positions they occupy when the carding engine is at work, the cover $l$ of the cylinder being locked by the lever $j$, and catch $k$; the tail end of this catch bearing against the end of the lever $n$ draws the wire $p$ tight and so overcomes the resistance of the spring $q'$ and holds the locking bolt $q$ up out of the slot $s^2$ in which position the strap fork is unlocked and can be moved freely but it is impossible to open the cover $l$ which is latched by the hook lever $j$ and catch and remains closed until the engine has been stopped.

Before opening the cover $l$ it is necessary to shift the driving belt onto the loose pulley and to stop the engine and when the ring $e$ on the driving pulley has come to a dead stop a wedge or lever can be inserted through one of the slots in the ring $e$ and between the plates $f, f'$, to separate or move the plate $f''$ away from the plate $f$; the movement of the plate $f''$ must be sufficient to actuate by the brake wire $h$ the lever $j$ and unlatch it from the catch $k$ which will liberate the cylinder cover $l$, and allow it to be opened; simultaneously with this movement of the catch $k$ the lever $n$ will be freed and the movement of this lever will slacken the Bowden wire so as to allow the spring $q'$ in the strap fork fixing $s'$ to force down the bolt $q$ into the slot $s^2$ and thus lock the strap fork and prevent it from being moved to shift the driving belt from the loose to the fast pulley. When the cover $l$ has been shut and the lever $j$ latched, the end of the catch $k$ comes against and moves back the lever $n$ and so tightens the brake wire $p$ which withdraws the bolt from the slot $s^2$ and so sets the strap fork $s'$ at liberty, and allows the carding engine to be set in motion.

In place of the hinged plates $f, f'$ I might employ the arrangement shown in Figs. 6 and 7 in which $t$ is a casing secured to the bracket $g$; $u$ a plate pivoted in the casing $t$; and $v$ a pivoted elbow lever to one arm of which is connected the brake wire $h$, which passes through the casing to the lever $j$, the slotted ring $e$ being employed as before. In this arrangement the wedge is pushed through a slot in the ring $e$ when it and the driving pulley are stationary and pressed against the plate $u$ which will act upon the lever $v$ and cause the brake wire $h$ to move the lever $j$ and unlatch it from the catch $k$ to release the cover $l$.

I wish it to be understood that my improvements can be applied to textile machines other than carding engines, such as scutching and opening machines in which at the present time means have been employed to prevent the covers over the gearing portion of the machine being opened when the machine is in motion; and to speed frames viz:—slubbing and roving frames in which means have been employed to automatically lock the covers when the starting handle is moved to shift the driving belt from the loose to the fast pulley, but in all of these cases the machines may be started when the covers have been left open.

By my improvements I am enabled to prevent the covers being opened when the machines are in motion and until they have come to a stand-still and further to prevent the machines being started until the covers have been closed.

I have described the ordinary Bowden brake wire in which an inner stranded wire is pulled through an outer flexible tube for making the different connections but in place of this Bowden wire, the wires might be arranged to push in place of to pull the levers, by adopting the "Vim" system of brake wire, in which an inner coiled wire is pushed through an outer flexible tube.

What I claim and desire to secure by Letters Patent of the United States is:—

1. The combination with the cover of the main cylinder and means for locking the same, said locking means comprising a pivoted hooked lever, a catch on the cover with which the lever is adapted to contact, a movable plate, means preventing said plate from being moved until the machine is stopped, a flexible connection consisting of a wire covered by an outer tube from said plate to the hooked lever, of a belt shifter and fast and loose pulleys, a bar upon which the belt shifter slides, said bar having a notch therein, a spring bolt adapted to engage said notch to lock the belt shifter, a lever adapted to engage with the catch on the cover and to be held against movement by said catch, and a flexible connection consisting of a wire covered by an outer tube between said lever and the spring bolt, substantially as described.

2. In combination, the main cylinder shaft, the driving pulley thereon, the slotted ring $e$ fast on the driving pulley, a pair of plates placed opposite the slots in the ring $e$, one of said plates being movable, a main cylinder cover, a catch on the same, a pivoted hooked lever $j$ adapted to engage with the catch to lock the cover, a flexible connection consisting of a wire covered by an outer tube from said lever to the movable plate, a lever $n$ controlled by the catch on the cover, a belt shifter, a spring locking bolt for the same, and a flexible connection consisting of a wire covered by an outer tube connecting said bolt to the lever $n$, substantially as described.

In testimony whereof I have signed my name to this specification in the presence of two subscribing witnesses.

WILLIAM LEWIS HOLLAND.

Witnesses:
HENRY BERNOULLI BARLOW,
HERBERT ROWLAND ABBEY.